US006344806B1

(12) United States Patent
Katz

(10) Patent No.: US 6,344,806 B1
(45) Date of Patent: Feb. 5, 2002

(54) PARKING STATUS CONTROL SYSTEM AND METHOD

(76) Inventor: Yoram Katz, 29 Lynn Rd., Needham, MA (US) 02494

( * ) Notice: Subject to any disclaimer, the term of this patent is extended or adjusted under 35 U.S.C. 154(b) by 0 days.

(21) Appl. No.: 09/784,519

(22) Filed: Feb. 15, 2001

(51) Int. Cl.[7] .................................................. B60Q 1/48

(52) U.S. Cl. .................... 340/932.2; 340/904; 340/933; 340/988; 235/384; 705/13

(58) Field of Search .............................. 340/932.2, 933, 340/928, 938, 870.2, 870.07, 988, 991, 992, 994, 904; 705/13; 235/384

(56) References Cited

U.S. PATENT DOCUMENTS

| | | | | |
|---|---|---|---|---|
| 3,999,372 A | | 12/1976 | Welch et al. | 58/142 |
| 4,043,117 A | | 8/1977 | Maresca et al. | 58/142 |
| 4,310,890 A | | 1/1982 | Trehn et al. | 364/467 |
| 4,379,334 A | | 4/1983 | Feagins, Jr. et al. | 364/467 |
| 4,532,418 A | | 7/1985 | Meese et al. | 235/381 |
| 4,823,927 A | | 4/1989 | Speas | 194/217 |
| 4,963,723 A | | 10/1990 | Masada | 235/384 |
| 5,029,094 A | | 7/1991 | Wong | 364/467 |
| 5,310,999 A | | 5/1994 | Claus et al. | 235/384 |
| 5,382,780 A | | 1/1995 | Carmen | 235/384 |
| 5,432,508 A | | 7/1995 | Jackson | 340/932.2 |
| 5,570,771 A | | 11/1996 | Jacobs | 194/200 |
| 5,737,710 A | | 4/1998 | Anthonyson | 701/1 |
| 5,751,973 A | | 5/1998 | Hassett | 395/213 |
| 5,777,951 A | | 7/1998 | Mitschele et al. | 368/90 |
| 5,805,082 A | | 9/1998 | Hassett | 340/928 |
| 5,819,234 A | | 10/1998 | Slavin et al. | 705/13 |
| 5,845,268 A | | 12/1998 | Moore | 705/418 |
| 6,037,880 A | | 3/2000 | Manion | 340/932.2 |
| 6,102,285 A | * | 8/2000 | Elias | 235/377 |
| 6,109,418 A | | 8/2000 | Yost | 194/350 |
| 6,142,702 A | | 11/2000 | Simmons | 404/6 |
| 6,240,365 B1 | * | 5/2001 | Bunn | 701/213 |
| 6,249,233 B1 | * | 6/2001 | Rosenberg et al. | 340/932.2 |
| 6,266,609 B1 | * | 7/2001 | Fasterrath | 701/200 |
| 6,292,110 B1 | * | 9/2001 | Budnovitch | 340/932.2 |

FOREIGN PATENT DOCUMENTS

| | | |
|---|---|---|
| JP | 58-222369 | 12/1983 |

* cited by examiner

*Primary Examiner*—Edward Lefkowitz
*Assistant Examiner*—Davetta W. Goins
(74) *Attorney, Agent, or Firm*—McDermott, Will & Emery

(57) ABSTRACT

A parking status control system and method allow a parking space, or plurality of parking spaces, to be automatically monitored to detect unauthorized occupancy. The system and method may be applied to metered parking spaces or to other situations where controlled access to a parking space or area is desired. The presence or lack of a vehicle in a monitored parking space is determined using a vehicle presence detector, which communicates a signal indicative of such presence to a central system. A user or vehicle based authorization module is configured to transmit an authorization input to facilitate automated satisfaction of a space authorization device, e.g., payment of a parking meter. If there is occupancy, but no proper authorization input, the central system declares a violation and communicates the violation to another system or individual charged with taking corrective action.

31 Claims, 10 Drawing Sheets

PARKING STATUS CONTROL SYSTEM AND METHOD

FIELD OF THE INVENTION

The present invention generally relates to systems and methods used in conjunction with vehicle parking spaces. More specifically, the present invention relates to systems and methods for monitoring and controlling usage of such vehicle parking spaces.

BACKGROUND OF THE INVENTION

To an ever increasing degree there seems to be contention for space on today's roadways. To accommodate the steady growth in the population of vehicles, both personal and business vehicles, project after project is undertaken to expand and revamp the roadways, such as the multi-billion dollar "Big Dig" project in Massachusetts. Along with the vast number of vehicles on the roads, comes contention for parking spaces for those vehicles, primarily in urban and, increasingly, in suburban areas.

As with any resource that is in relatively short supply and high in demand, parking spaces frequently come at a cost. Typically, in an urban or suburban area, a city or town will provide metered public parking spaces. The parking meters accept coins in return for time on the meter, which is allowed time in the parking space associated with the meter. The typical parking meter allows a relatively short maximum amount of time for parking, e.g., a two hour limit, before the time on the meter expires. When the meter expires, the owner of a parked vehicle in the corresponding parking space is subject to a citation or parking ticket. As a result, if a vehicle owner wishes to park for an amount of time in excess of the meters limit, the vehicle owner must return to the meter and insert more coins before it expires. This tends, of course, to be very frustrating for the vehicle owner.

To ensure adherence to the requirement to pay for metered parking spaces or, in the alternative, to issue citations to violators, the city or town employs individuals (sometimes referred to as "meter maids") to go around the city or town and determine, on a meter-by-meter basis, whether a violation at a meter has occurred and, if so, to issue a citation. Of course, the individuals come at some expense to the city or town and for the large majority of the meters checked there is, in fact, no violation. Therefore, this process of monitoring adherence to the meter requirements is extremely inefficient and costly for cities and towns.

Private parking spaces are also available in such areas where parking spots are in short supply. These private spaces typically also come at some expense to the vehicle owner, but offer the convenience of not having to replenish the meter with coins throughout the day. For other reasons, private parking spaces may also be desirable, such as, for example, for greater security or convenience. That is, an office building, resort, or club may offer private parking spaces to its tenants, guests, or members. These private parking spaces often come in the form of a parking garage or lot that charges the vehicle owner based on time spent in the garage or lot. Many of these private garages or lots issue a fixed number of monthly parking passes for a monthly cost of $200 to $300, for example, per parking space or pass. In some cases, parking spaces are assigned to specific vehicles. With assigned spaces, improperly parked vehicles are frequently towed, but usually not until the proper occupant has determined that another vehicle is improperly occupying his space. In other arrangements, the public can use private parking garages and pay by the hour, for example. In such private parking arrangements, the owner of the private parking garage or lot often employs attendants to determine the time spent in the garage and to collect the corresponding payment from the vehicle owner.

SUMMARY OF THE INVENTION

The present invention is a parking status control system and method that automatically monitors one or more parking spaces for unauthorized occupancy. Such parking spaces may be publicly metered parking spaces or privately owned and controlled parking spaces. When a space is occupied, the owner or user of a vehicle may accomplish automated payment of parking fees, so as to avoid fines associated with citations due to an expired parking meter, for example. Preferably, whether paying for parking time in a garage or on a meter, standard methods of payment are accommodated. However, regardless of the methods of payment accommodated by various implementations, occupancy of the parking space and sufficiency of payment are monitored to determine if a parking space is being illegally or improperly used.

Generally, a monitored space can be considered to have two states: 1) occupied, and 2) vacant. The presence or lack of a vehicle in a parking space is monitored by a vehicle presence detector. A vehicle presence detector may sense a vehicle in any of a variety of manners. For example, the vehicle presence detector may use magnetic, infrared, motion detection, pressure, or acoustic sensing to determine whether a vehicle has parked in a monitored parking space. Once a vehicle is detected, the vehicle presence detector generates a space-state signal indicating that a vehicle is in the parking space. In other embodiments, a space-state signal could indicate that the parking space is vacant. In other embodiments, different space-state signals could be generated when the parking space is vacant and when it is occupied.

The space-state signal is communicated to a central computer system by wired or wireless means, or some combination thereof. A local transponder proximate to the monitored space may be used to establish wireless communication with the vehicle presence detector, wherein the local transponder may then receive and forward the space-state signal, or a signal indicative thereof, to the central computer system. When the space-state signal indicates to the central computer system that a monitored parking space is occupied by a vehicle, the central computer system then awaits, for a certain period of time, receipt of an authorization signal from a corresponding device associated with the monitored space and configured to accept or facilitate authorization to use the parking space. If the authorization signal is not received in due time, the central computer system declares a parking space violation, i.e., an illegally parked vehicle.

A space authorization device, such as a parking meter, accepts an input to authorize use of the parking space, i.e., via generation of an authorization signal. In the case of a parking meter, the input may be the insertion of coins to pay meter fees. In such a case, the parking meter is equipped with a meter transceiver that communicates an authorization signal to the central computer system in response to such inputs. If the vehicle is in the parking space beyond the time paid for, the transceiver ceases to send the authorization signal and, if the vehicle is still in the parking space, the central computer system declares a violation.

In accordance with the present invention, a user or vehicle based portable transceiver may also be used to facilitate automated payment of meter fees, or the purchase of meter credits. In such case, the portable transceiver may be configured to provide an authorization signal to central computer system via the transponder. This authorization signal is provided in lieu of an authorization signal being provided by the meter transceiver in response to the insertion of coins into the meter. The portable transceiver may be configured to accept debit or credit card payment of meter fees or the purchase of meter credits used to pay the fees. When credits are purchased, they may be "loaded on" the portable transceiver or stored in an account at, or accessed by, the central computer system. In a similar manner, the portable transceiver may be used to purchase time in a parking garage or authorize use of a private parking space. If the credits run out or the debit or credit card accounts cease to provide payment of meter fees, the authorization signal is terminated and, assuming the vehicle still occupies the parking space, a violation is declared by the central computer system. Additionally, the portable transceiver may be configured to provide an authorization signal that is not indicative of a monetary input, but is rather indicative of a status or designation where such monetary input is not required. For example, police, fire, medical, government personnel or monthly garage pass holders may have such status or designation.

When a violation is declared, the central computer system may generate a violation is signal and a meter monitor may be dispatched to the parking space to issue a parking ticket or take other appropriate action. The meter monitor may be equipped with a meter monitor device that allows each of the vehicle presence detector and transponder to be probed to ensure they are operating properly. Additionally, the meter monitor device may also be configured to receive the violation signal, and any relevant related information.

BRIEF DESCRIPTION OF THE DRAWINGS

The foregoing and other objects of this invention, the various features thereof, as well as the invention itself, may be more fully understood from the following description, when read together with the accompanying drawings, described.

For the most part, and as will be apparent when referring to the figures, when an item is used unchanged in more than one figure, it is identified by the same alphanumeric reference indicator in all figures.

DETAILED DESCRIPTION OF THE PREFERRED EMBODIMENT

The present invention is a parking status control system and method, which allows a parking space, or plurality of parking spaces, to be automatically monitored for unauthorized occupancy. The system and method may be applied to metered parking spaces or to other situations where controlled access to a parking space or area is desired. The presence or lack of a vehicle in a monitored parking space is determined using a vehicle presence detector, which communicates a signal indicative of such lack of vehicle presence to a central system. A user or vehicle based authorization module is configured to transmit an authorization signal to facilitate automated satisfaction of fees for a parking space, e.g., payment of a parking meter. If there is occupancy in a parking space, but no proper authorization signal, the central system declares a violation and communicates the violation to another system or individual charged with taking corrective action.

Figure 1:
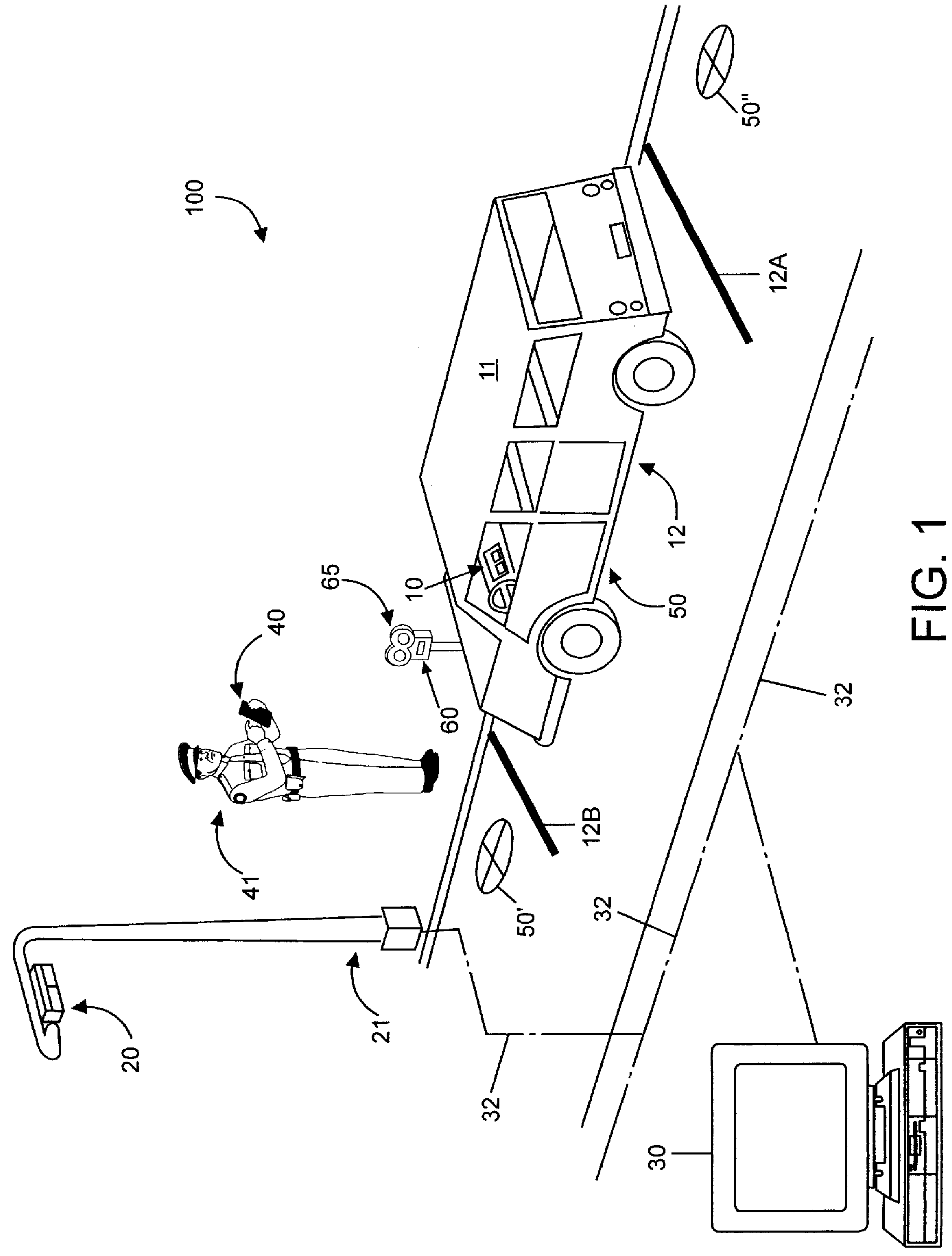
FIG. 1 is a system level diagram of a parking status control system in accordance with the present invention.

FIG. 1 shows an embodiment of a parking status control system 100 in accordance with the present invention. FIG. 2A through FIG. 6 are detailed figures of several of the modules shown in FIG. 1. FIG. 7A and FIG. 7B provide a detailed flow chart of a method that may be implemented by the system of FIG. 1.

As is typical, a parking space 12 is defined by parking space lines 12A and 12B, between which a vehicle 11 is parked. Parking space 12 has two possible states, i.e., vacant or occupied and is metered by a parking meter 65, as a space authorization device. In this embodiment, each parking space includes an in-ground detector, as a vehicle presence detector. Depending on the embodiment, the vehicle presence detector may be configured to respond to the presence or lack of a vehicle occupying the corresponding monitored parking space. Though not visible in FIG. 1, an in-ground detector 50 is positioned in parking space 12, and oriented similarly to detectors 50' and 50" in the adjacent parking spaces. In the preferred embodiment, in-ground detector 50 is configured to transmit a space-state signal when parking space 12 is vacant (i.e., a vacant state), shown as step 702 in flow chart 700 of FIG. 7A. A determination is continually made by a central computer system 30 based on the receipt or absence of a signal from in-ground detector 50 of whether or not space 12 is occupied, in step 704. In-ground detector 50 periodically sends the space-state signal, in step 706, while parking space 12 is vacant. In the preferred form, in-ground detector 50 communicates with central computer system 30 via a local transponder 20, which, in step 708, also monitors the technical integrity of in-ground detector 50.

Once in-ground unit 50 senses the presence of a vehicle in parking space 12, in this case vehicle 11, in-ground unit 50 ceases transmission of the space-state signal, in steps 710, 712 and 714. There are a variety of manners in which in-ground detector 50 may sense the is presence of vehicle 11 occupying parking space 12, but in the preferred embodiment, inground detector 50 establishes a magnetic field within which a vehicle can be detected.

Depending on the embodiment, transponder 20 may be configured to selectively communicate with one or more in-ground detectors 50. In FIG. 1 transponder 20 is mounted on a pole 21, but transponder 20 may alternatively be mounted on other surfaces or items, such as a wall, a sign, or a cable, as examples. For example, to service a plurality of in-ground detectors, transponder 20 can be configured to implement a time division multiplexing scheme for servicing each of the several in-ground detectors in-turn or transponder 20 can be configured to passively "listen" to several designated in-ground detectors. The communication path between in-ground unit 50 and transponder 20 is a wireless path. In other embodiments, the communication path between in-ground detector 50 and transponder 20 may be a wired network or direct line (e.g., copper, fiber optic, or cable).

As mentioned, in the preferred embodiment, once a vehicle is detected in parking space 12, in-ground detector

50 ceases transmission of the space-state signal to transponder 20. However, in another embodiment, in-ground detector 50 may be configured to transmit a signal at each change of state, i.e., from vacant to occupied and from occupied to vacant. In other embodiments, in-ground detector 50 may be configured to transmit a space-occupancy signal when parking space 12 is occupied and cease to transmit the space-state signal when parking space 12 is vacant. In yet other embodiments, in-ground detector 50 may transmit a space-unoccupied signal when parking space 12 is vacant and transmit a space-occupied signal when a vehicle is parked in space 12.

In yet another embodiment, in-ground detector 50 may be configured to continuously transmit a space-state signal, such as a simple pulse of energy, which is not received by transponder 20 when vehicle 11 occupies parking space 12, due to the fact that a vehicle in parking space 12 physically blocks the wireless communication path between in-ground detector 50 and transponder 20. In this embodiment and in the preferred embodiment, the lack of a space-state signal is interpreted as occupancy of parking space 12, as in step 714. Depending on the embodiment, the communication path between in-ground unit 50 and pole transponder 20 may wired, wireless, or some combination thereof.

Additionally, in other embodiments, a vehicle presence detector (e.g., in-ground detector 50) may be mounted on, coupled to, or integral with a curb, pole, or meter adjacent to a parking space. Depending on the messaging and communication scheme between the vehicle presence detector and the transponder, a line of sight path between the two may or may not need to be maintained. In other embodiments, the vehicle presence detector and transponder may be collocated with or integrated into a single module, and that module may be located in-ground or mounted on, coupled to, or integral with a pole, wall, meter, curb, or the like.

In yet other embodiments, the vehicle presence detector (e.g., in-ground detector 50) may communicate directly with central computer system 30 and transponder 20 may be omitted. This communication may be by wired or wireless means, or some combination thereof.

Returning to the embodiment of FIG. 1, while parking space 12 is vacant, transponder 20 receives the space-state signal from in-ground detector 50, in steps 702 and 706. When transponder 20 ceases to receive the state-space signal from in-ground detector 50, central computer system 30 interprets this lack of a signal as the space being occupied, in step 714. Central computer system 30 serves as a central monitor and processor of various system resources. Those skilled in the art will appreciate that central computer system 30 is shown as having a single computer for illustrative purposes, but that central computer system 30 may be comprised of several computers, processors, and/or servers and that there may be several of such devices collocated, remote to each other, or some combination thereof.

Each parking space and meter is uniquely identified, so that the central computer system 30 can make specific determinations of which meters are being violated. Once central computer system 30 stops receiving a space-state signal from in-ground unit 50 for parking space 12, central computer system 30 looks for an authorization signal from a corresponding portable transceiver 10, in step 716, or meter transceiver 60, in step 766, included with meter 65. In either case, the authorization signal is communicated to pole mounted transponder 20 via a wireless communication path and then forwarded to central computer system 30. Preferably, the central computer system 30 starts a timer that establishes a grace period (e.g., 5 minutes) to receive the authorization signal.

Satisfaction of meter 65 is determined by central computer system 30, which monitors meter transceiver 60 to determine if a valid meter input has been received to authorize use of parking space 12. The valid input causes the generation of an authorization signal provided by transceiver 60 or by portable transceiver 10. As an example, an authorization signal transmitted by meter transceiver 60 provides an indication to central computer 30 that meter 65 has received coin payment of meter parking fees. In the present invention, in addition to, or instead of, typical coin inputs, central computer system 30 can receive an authorization signal based on inputs indicative of monetary credits, financial account information, or a user or vehicle based authorization not to charge for parking. An authorization signal from portable transponder 10 provides an indication that the parking meter fees are to be paid via an account (e.g., credit or debit) or that the user or vehicle is not to be charged meter fees.

Portable transceiver 10 may be carried by a user (e.g., the driver of a vehicle) or integral with or mounted to a vehicle, such as transceiver 10 in vehicle 11 of FIG. 1. In some instances, the portable transponder may be user-based and battery powered, such that the user can use portable transponder 10 regardless of the vehicle the user is operating. In other cases, the portable transponder may be integrated into the vehicle, as is a radio, and powered by a vehicle power source. Certain groups or individuals may not be required to pay parking fees, such as police department personnel, fire department personnel, ambulance operators, government officials, pass holders in a parking garage, or members of a club, as examples. A database of such individuals or vehicles may be maintained by or linked to central computer system 30. Therefore, a transceiver 10 for such groups or individuals can be configured to generate and transmit an authorization signal that is not indicative of a monetary input, but that does satisfy central computer system 30.

Figure 2A:
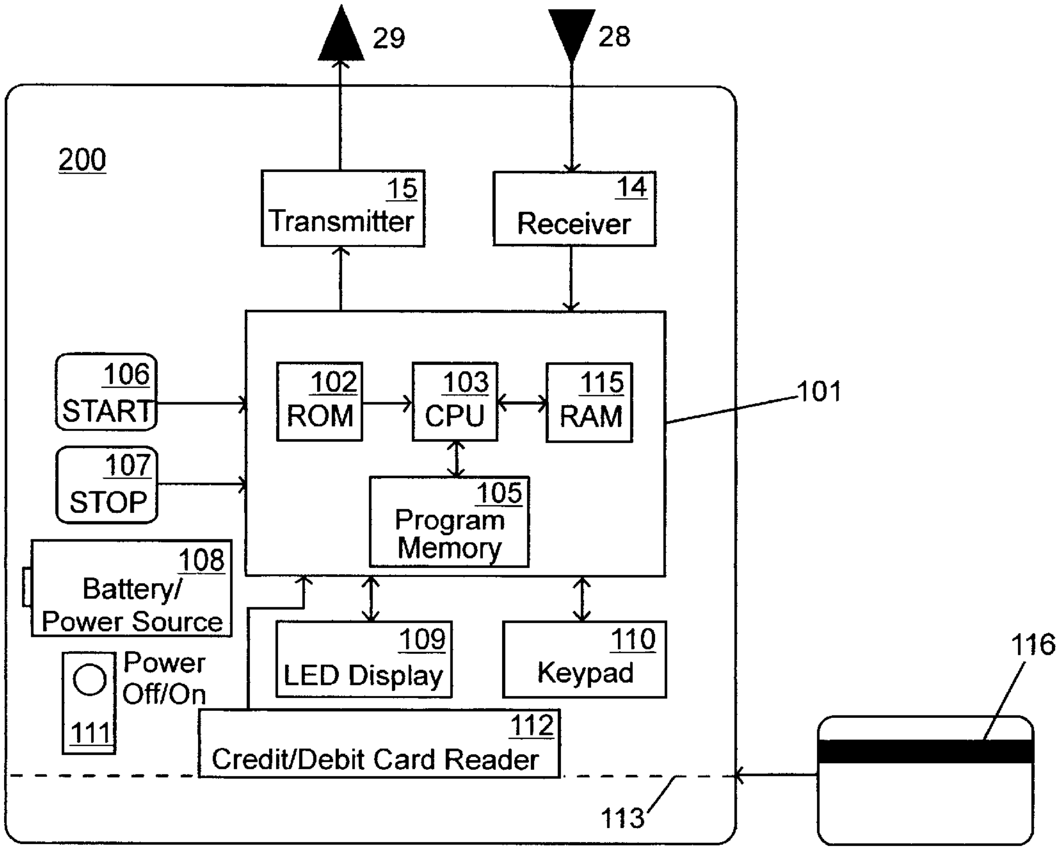
FIG. 2A is a circuit diagram and FIG. 2B is a perspective view of the portable transceiver of FIG. 1.
Figure 2B:
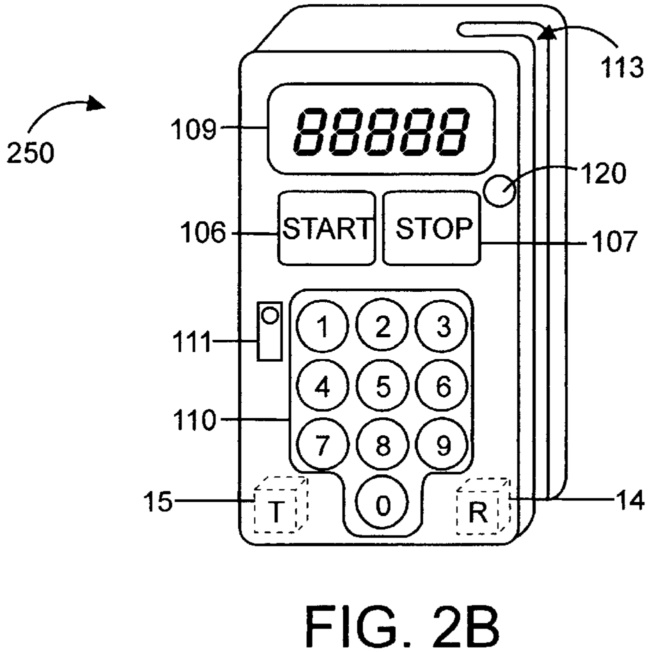

A portable transponder 10 in accordance with the preferred embodiment is shown in FIG. 2A and FIG. 2B. FIG. 2A shows a block diagram 200 of the components comprising transceiver 10. A processor 101, includes a central processing unit (CPU) 103 and various types of memory. The memory includes program memory 105, which provides long term storage of functional code, read only memory (ROM) 102, and random access memory (RAM) 115. Portable transceiver 10 is powered by a battery source 108, which may be any of a number of available sources. To facilitate user interaction with portable transceiver 10, a display (e.g., light emitting diode (LED) display 109), keypad 110, stop button 107, start button 106, and on/off power switch 111 are provided. In the preferred form, portable transceiver 10 includes a credit/debit card slot 113 and reader 112 that enables the payment of parking fees or purchasing of parking credits using a typical credit or debit card 116.

FIG. 2B shows a perspective view 250 of portable transceiver 10, illustrating the user interactive elements of FIG. 2A. To commence electronic payment of parking fees using portable transceiver 10, the user of vehicle 11 presses start button 106, in step 718 of FIG. 7A and an identification of portable transceiver 10 (or a transceiver ID) is transmitted to central computer system 30 via transponder 20, in step 720. Central computer system 30 transmits an acknowledgement message back to portable transceiver 10, in step 724, which includes a request for debit or credit card information, and may provide parking rate information for meter 65. The parking rate, which may vary for different time periods, is known to central computer system 30 (e.g., stored in a database) or communicated by a system linked to central computer system 30 or by meter transceiver 60. To pay the parking fees, the user swipes a debit or credit card through card slot 116 and the account information is read and preferably encrypted by processor 101, in step 726. The encrypted account information is transmitted by transmitter 15 to central computer system 30 via transponder 20, in step 728.

In step 730, a determination is made by central computer system 30 of whether the received, and decrypted, debit or credit card information is valid by, for example, querying a third party debit or credit issuer system. If the information can not be confirmed as valid, central computer system 30 transmits an "invalid card" message to receiver 14 of portable transceiver 10, via transponder 20, in step 732. The message is displayed in display 109 of portable transceiver 10. If the account information is determined to be valid, in step 734, the central computer system 30 sends a personal identification number (PIN) request to portable transceiver 10, which is displayed in display 109, in step 736. Using keypad 110, the user enters a PIN, in step 738, which is encrypted and transmitted to central computer system 30, in step 740.

In step 742, determination of the validity of the PIN is made by central computer system 30. This is done by comparing the PIN with a database of PINs associated with specific transceivers at central computer system 30. Preferably, if the PIN is not determined to be valid, a counter is started in step 744 and the user is given three chances, in step 746, to enter the correct PIN. If unsuccessful, the PIN is determined to no longer be valid, in step 748, and the process returns to connector 210 of FIG. 7A. If the PIN is determined to be valid, in step 742, central computer system 30 sends an "in use" message to receiver 14 of portable transceiver 10 and commences time measurement, in step 750. In response, in step 752, processor 101 causes a light 120 (e.g., an LED) to be lit or to flash and portable transceiver 10 transmits a sequence of "in use acknowledgement" signals (or authorization signals) to central computer system 30 via transponder 20. Preferably, in response to receipt of each "in use acknowledgment" signal, central computer system 30 sends a signal to portable transceiver 10 indicating the cumulative amount charged, which is shown in display 109, in step 754.

In another embodiment, rather than debiting or charging the payment amount, the user may purchase, or have previously purchased, parking credits. The parking credits may be stored in an account at central computer system 30 or a system linked thereto and used when a valid PIN and transceiver ID are received, as described above. Optionally, credits could be "loaded on" portable transceiver 10, and the credits may be transferred to central computer system 30 via transceiver 20 to pay parking fees. The parking status control system may also be configured such that the user can buy parking credits, using a debit or credit card, as discussed above. In such embodiments, the system may be configured such that a user can establish a cap limit on the parking fees to be charged to a credit or debit card or credits to be used. For persons or vehicles that are not to be charged parking fees, receipt of the transceiver ID and corresponding PIN by central computer system 30 are sufficient to authorize use of meter 65.

Where payment is required, central computer system 30 continues to charge fees so long as the user has not terminated the session, or if the meter goes into an "off" state where it no longer requires payment of parking fees for use. At the portable transceiver 10, the processor 101 continues to monitor stop button 107 and receiver 14 to determine whether the portable transceiver 10 should cease sending the "in use acknowledgement" or authorization signal, in step 756. If an interrupt signal is detected, in step 758, processor 101 determines if the interrupt signal was generated because vehicle 11 drove out of range, in step 762, or whether stop button 107 was depressed, in step 758. Either case causes the charges or consumption of credits associated with the user of portable transceiver 10 to be terminated and processor 101 ceases sending the "in use acknowledgement" authorization signal to central computer system 30, in step 764. And, the final accumulated charges are communicated to the debit or credit card issuer and the municipality or private owner to the monitored parking space are paid the accumulated parking fees. The process then returns to connector 200 of FIG. 7A, where the parking status and control system awaits the next vehicle.

Returning to step 766 of FIG. 7A, when a user inserts coins into meter 65 (as an input), the meter transceiver 60 generates and transmits an authorization (or "in use") signal to central computer 30 via transponder 20, in step 768. As long as central computer system 30 is in receipt of the authorization signal from meter transceiver 60, central computer system will consider the use by vehicle 11 to be valid. Meter transceiver 65 may be configured to continually or periodically send the authorization signal. In other embodiments, the meter transceiver 60 can be configured to transmit an authorization signal at the start of a parking session (i.e., upon receipt of a valid input) and then transmit a termination signal when the parking session is over (i.e., when the meter has expired).

However, if central computer system 30 has determined that parking space 12 is occupied, but has not, within the grace period, received an authorization signal from meter transceiver 60, central computer system 30 designates meter 65 to be in an unauthorized use or illegally occupied state, in step 772. Meter 65 can be designated as being in an unauthorized use state by one of several means. First, if the user inserted coins into meter 65, upon or soon after expiration of the meter time paid for with the coins, meter transceiver 60 ceases to transmit the authorization signal, or transmits a termination signal, to central computer system 30, as described above. Depending on the embodiment, the user may be given the aforementioned grace period after expiration of the paid for meter time to insert additional coins, but if additional authorization is not obtained, the use is illegal. Similarly, if the meter was satisfied using credits associated with the portable transceiver 10, and those credits are consumed, central computer system 30 will no longer consider itself to be in receipt of an authorization signal. Accordingly, violation is designated for meter 65. If central computer system 30 accesses a debit or credit account associated with the user (or vehicle) of portable transceiver 10, and the funds in that account funds are exhausted or not available, central computer system 30 will no longer consider itself to be in receipt of an authorization signal. Accordingly, vehicle 11 would be designated as being illegally parked.

Upon, or soon after, central computer system 30 designates meter 65 to be in an unauthorized use state, i.e., vehicle 11 is illegally parked, central computer system 30 generates a meter violation signal. The meter violation signal includes an identification and/or location of meter 65. Central computer system 30 may transmit the meter violation signal to transceiver 60 of meter 65 to place meter 65 in an alarm state, wherein a red light of meter 65 may flash in response to the violation signal. In the preferred embodiment, in step 774, a meter monitor 41 is dispatched to meter 65. Meter monitor 41 may be equipped with a portable meter monitor device 40 configured to probe in-ground detector 50 and transponder 20 to verify that they are operating properly, in steps 776 and 778. A visual inspection of meter 65 may be accomplished to ensure there is no time left on the meter, in step 780. If everything is working properly and there is no paid for time left on meter 65, meter monitor 41 issues a ticket to vehicle 11, in step 782. Once vehicle 11 vacates parking space 12, in step 784, in-ground detector 50 detects the vacancy and reestablishes communication with central computer system 30, via transponder 20, and returns to connector 200 of FIG. 7A and awaits the next vehicle.

In other embodiments, the meter monitor device may include a greater compliment of functionality. For example, the meter violation signal could be forwarded from the central computer system 30, or a corresponding signal may be generated and transmitted, to meter monitor device 40 to automatically inform the meter monitor 41 of the illegally parked vehicle. If meter monitor device 40 is configured to receive the violation signal, processing the meter violation signal would identify the meter and/or its location on a display of the meter monitor device 40, e.g., meter ABC, 12 Main Street. If the identity of the user or vehicle were known to the central computer system 30, the meter monitor device 40 may also be configured to provide that or similar information.

If there were several violations occurring simultaneously, central computer system 30 may be configured to prioritize the violations based on any number of criteria, such as geographic proximity or time in unauthorized use state. If a meter monitor 41 has a dedicated geographic region of responsibility, central computer system 30 may provide the prioritized list, and an accompanying route, to meter monitor device 40.

In yet other embodiments, central computer system 30 may be operated on behalf of a local police department, or linked to a local police department system for automatically issuing parking citations and/or deploying tow trucks in response to a determination by central computer system 30 of a parking meter violation. In such a case, meter monitor 41 may not be required to visit meter 65, or may only be required to visit meter 65 to ensure proper operation of in-ground detector 50, transponder 20 and, possibly, meter 65 and transceiver 60.

In some embodiments, diagnostics may be included with the parking status control system. In such a case, some or all of the diagnostics may be managed by central computer system 30, through interaction with transponder 20, transceiver 60, in-ground detector 50, portable transceiver 10, or some combination thereof. Such diagnostic interaction with these various systems components may be direct or via transponder 20, depending on the implementation.

Figure 3:
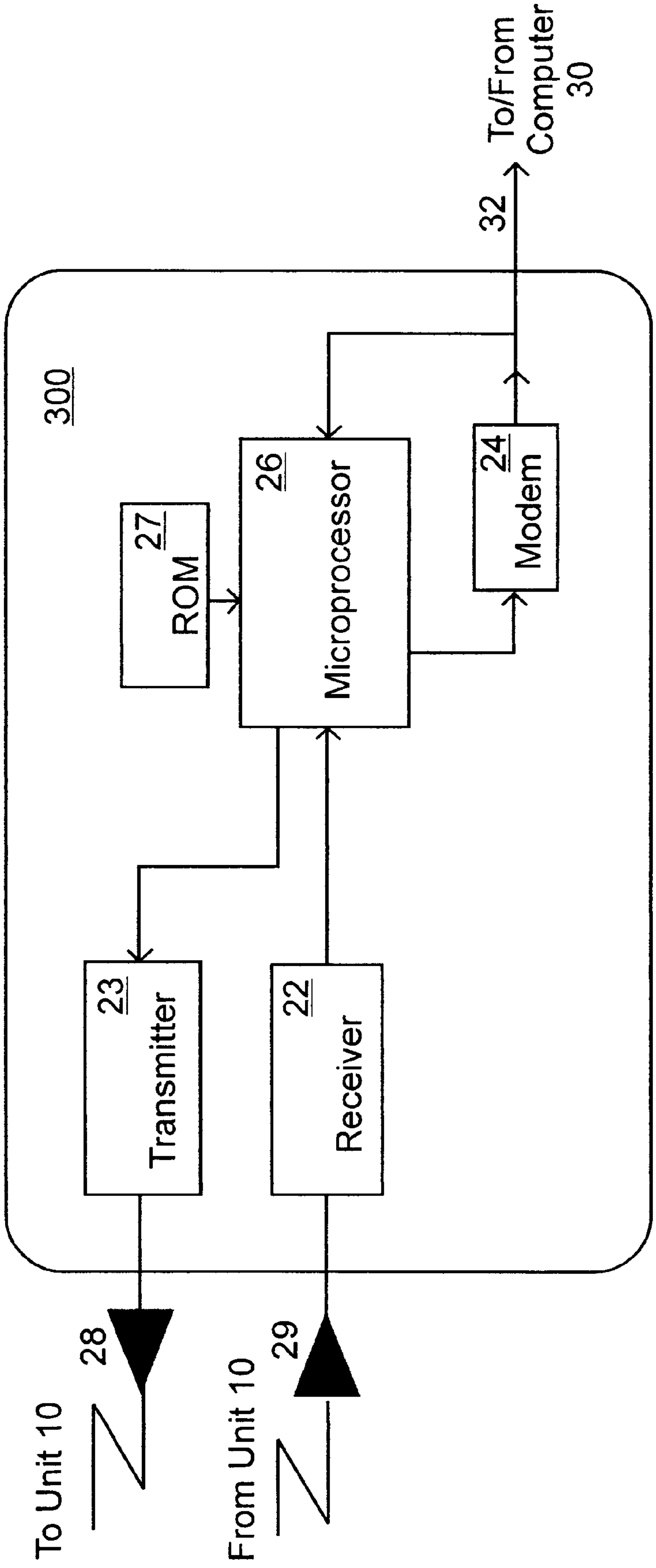
FIG. 3 is a circuit diagram of the transponder of FIG. 1.

FIG. 3 shows a circuit diagram 300 for pole mounted transponder 20. In the preferred form, transponder 20 communicates with each of in-ground detector 50, meter transceiver 60, and portable transceiver 10 and provides a means for communication with central computer system 30. Transponder 20 also communicates with meter monitor device 40. Transponder 20 includes standard components, such as receiver 22, transmitter 23, microprocessor 26, ROM 27, and modem 24. In the preferred form, transmitter 23 and receiver 22 provide an interface to portable transceiver 10, in-ground detector 50 and meter transceiver 60. Modem 24 provides an interface to central computer system 30. The various communications between these devices is as previously discussed.

Figure 4:
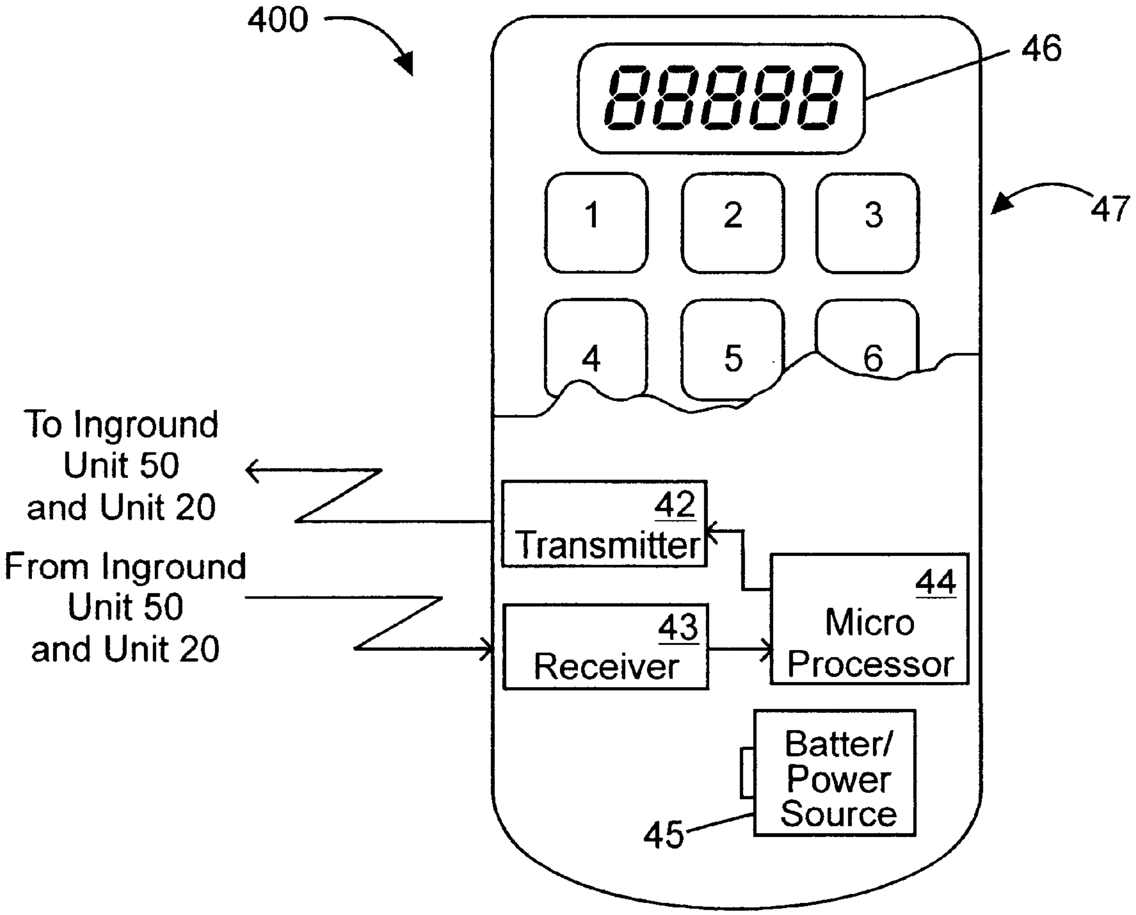
FIG. 4 is a partial cutaway view of the meter monitor device of FIG. 1.

FIG. 4 is a partial cutaway view 400 of the meter monitor device 40, wherein the cutaway shows a simplified circuit diagram. Meter monitor device 40 includes a transmitter 42, receiver 43 and microprocessor 44, and is powered by battery 45. In the preferred embodiment, transmitter 42 and receiver 43 facilitate two-way communications with transponder 20 and in-ground detector 50 to perform the probing operations previously discussed. Interfaces may also be provided to transponder 20 to facilitate communication with central computer system 30, for the various embodiments discussed above.

Figure 5:
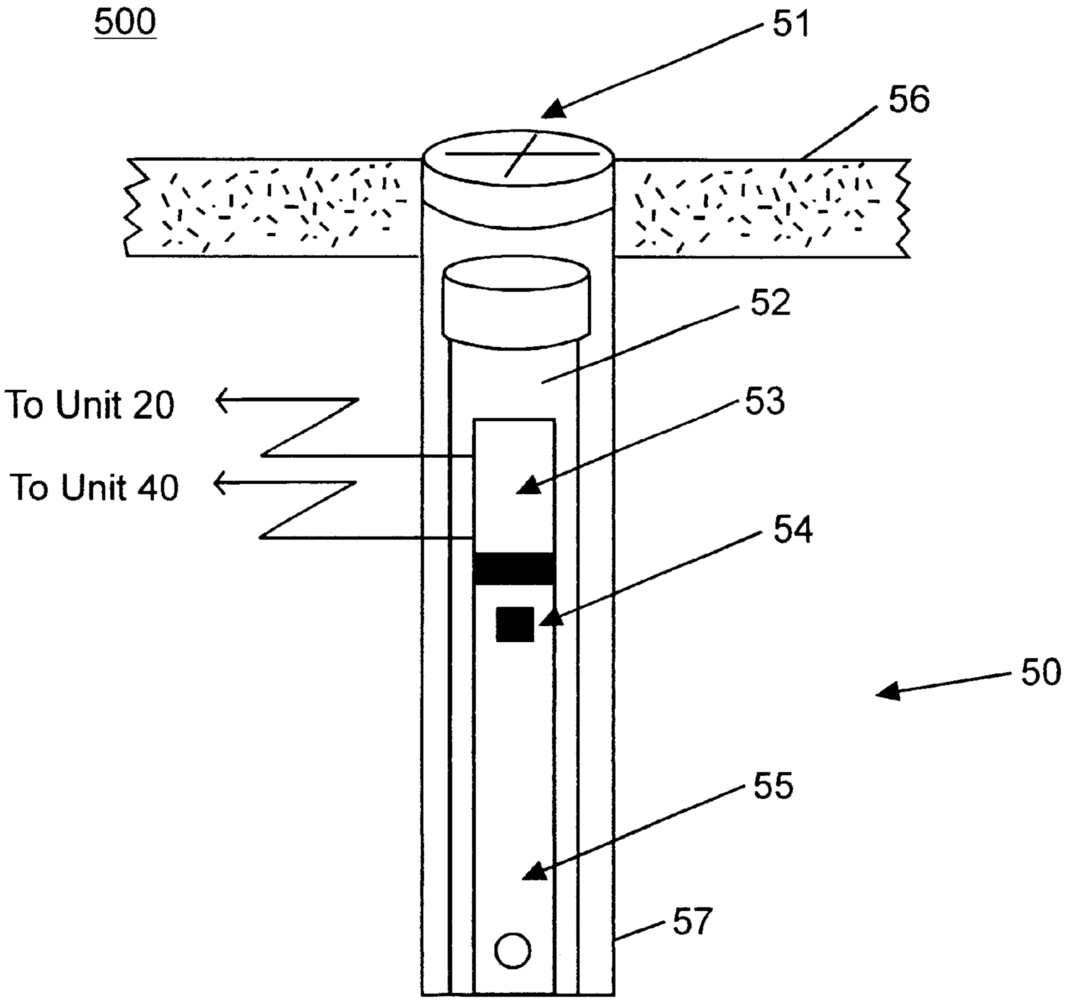
FIG. 5 is a cross sectional view of the in-ground detector of FIG. 1.

FIG. 5 shows a cross section diagram 500 of in-ground detector 50 (i.e., a vehicle presence detector) of the preferred embodiment. In-ground detector 50 is located in a cavity in the pavement of its corresponding parking space 12. Preferably, the cavity is defined by a canister 57 having a removable cap 51 that is substantially flush with the surface of pavement 56. The in-ground detector 50 may also be located within a container 52. Such a configuration allows greater protection of in-ground unit 50 during storage, transport, and location within canister 57, and facilitates removal of in-ground unit 50 (while remaining within container 52) for maintenance and replacement.

In-ground unit 50 includes an antenna 53 that facilitates communication with transponder 20 and meter monitor device 40, as previously described. In this embodiment, the vehicle sensing mechanism is a magnetic sensing unit 54 that, through its magnetic field, detects the presence of a vehicle above. With such a magnetic sensing unit 54, it is important that container 52, canister 57 and cap 51 do not perturb or interfere with (e.g., shield) the magnetic field interaction between a vehicle above and magnetic sensing unit 54. A group of electronics 55, including a microprocessor and associated memory, carry out the aforementioned functionality of in-ground detector 50, such as the generation, transmission, reception and processing of messages exchanged with transponder 20 and meter monitor device 40. In-ground unit 50, is a relatively low power device that may be powered by any of a number of known battery types, such as a battery. Alternatively, power could be provided to container 57, canister 52, or electronics 55 via an in-ground AC or DC source.

Figure 6:
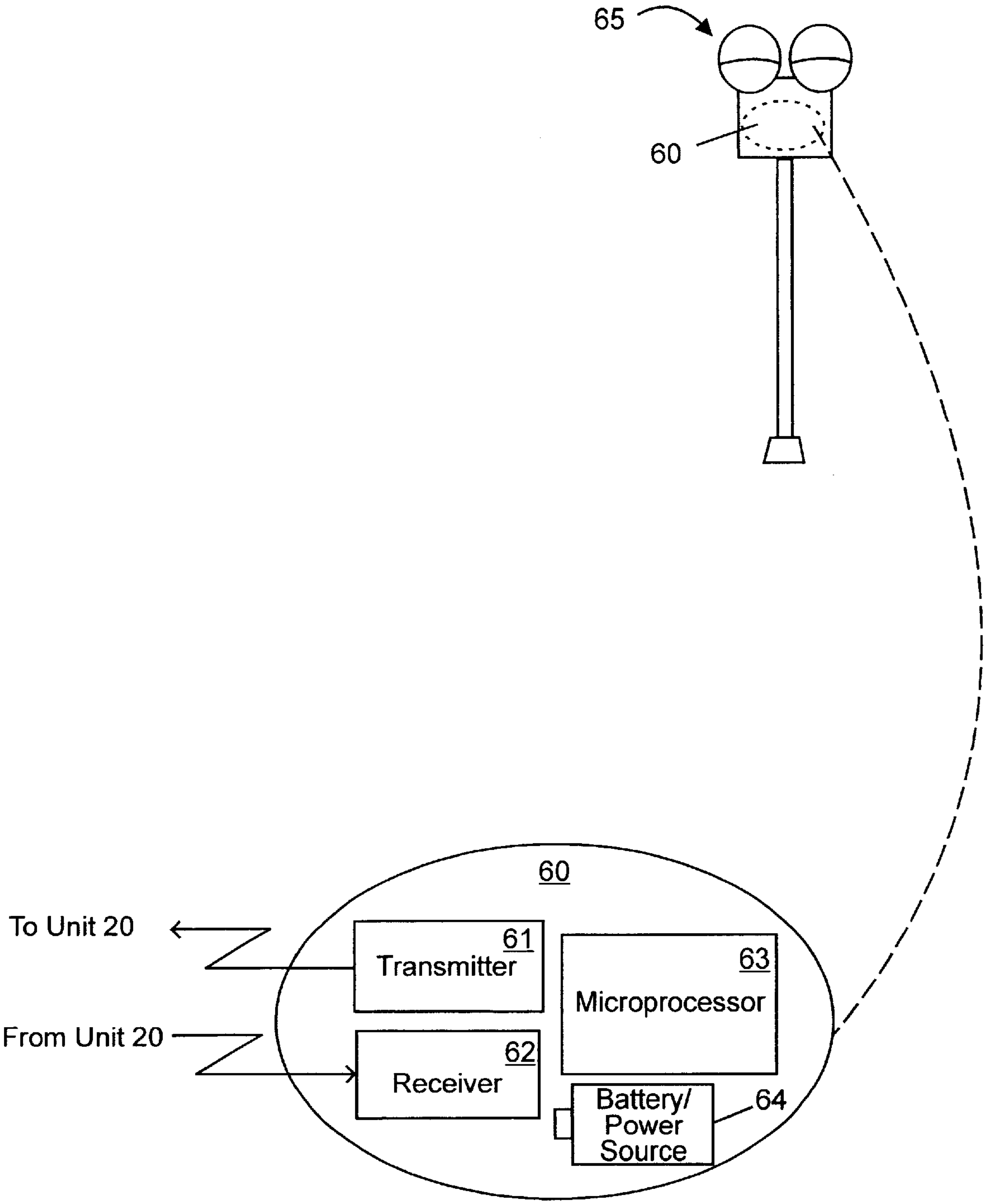
FIG. 6 is view of the meter transceiver of FIG. 1.
Figure 7A:
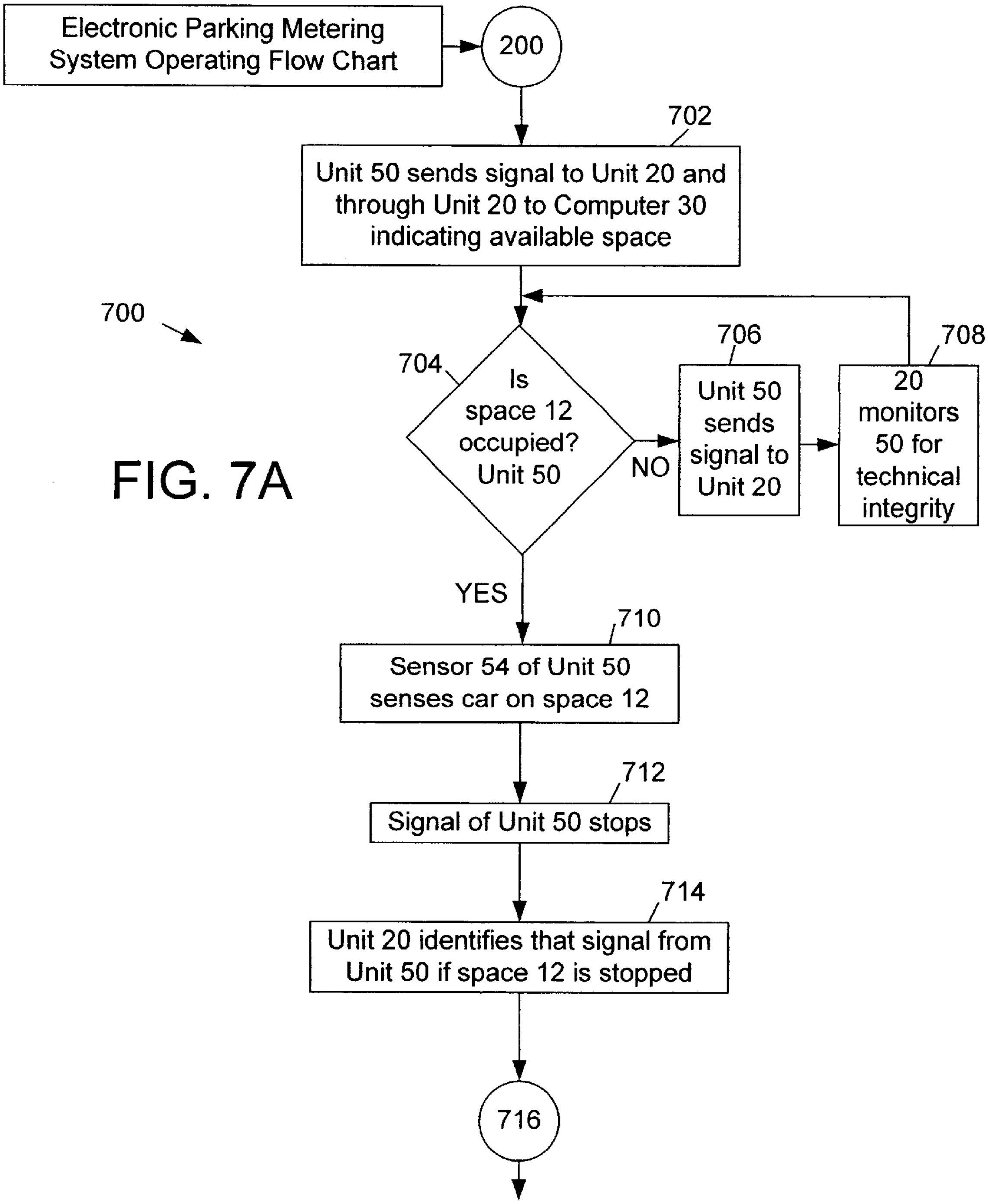
FIG. 7A and FIG. 7B provide a flow chart of a method used with the system of FIG. 1.
Figure 7A:
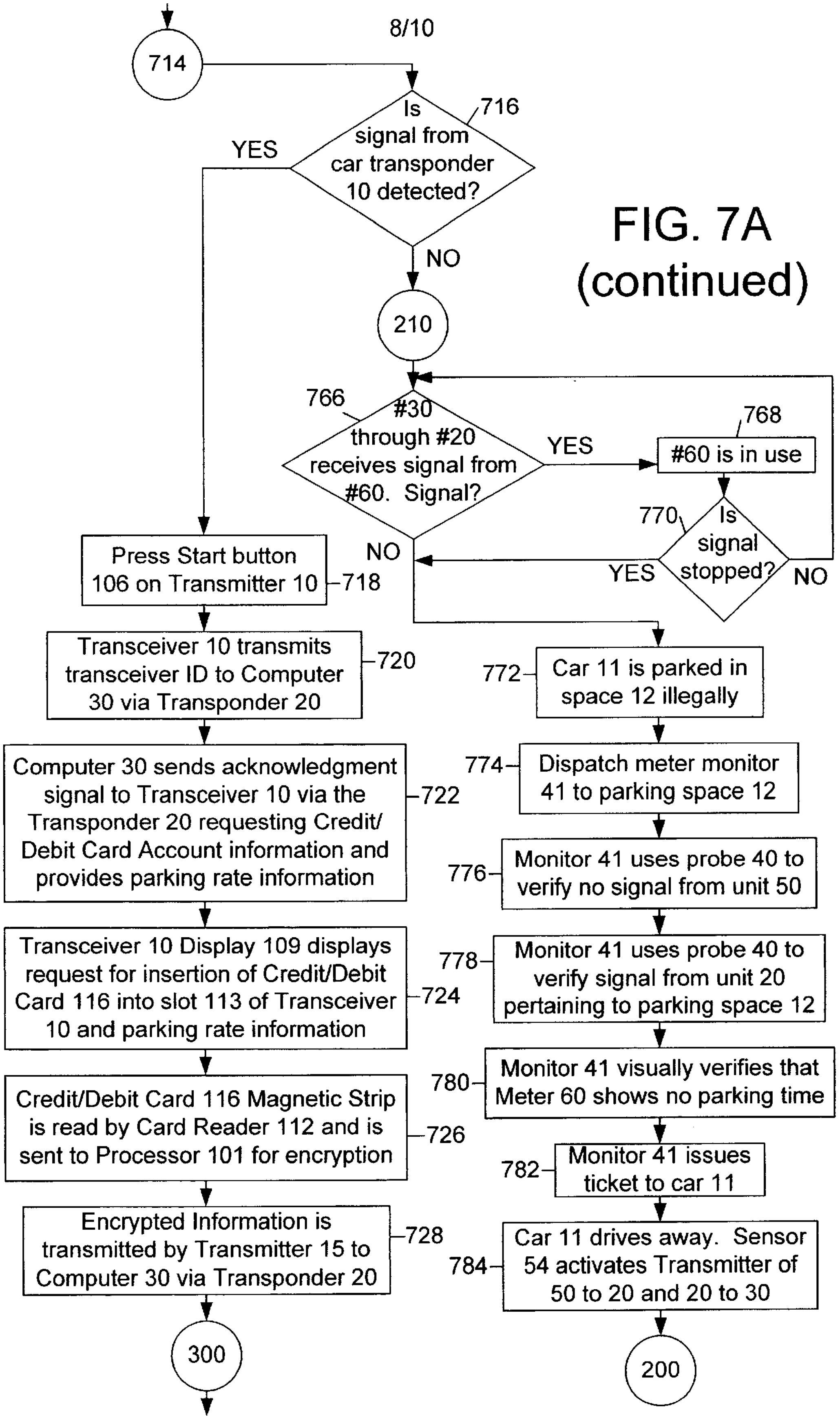
Figure 7B:
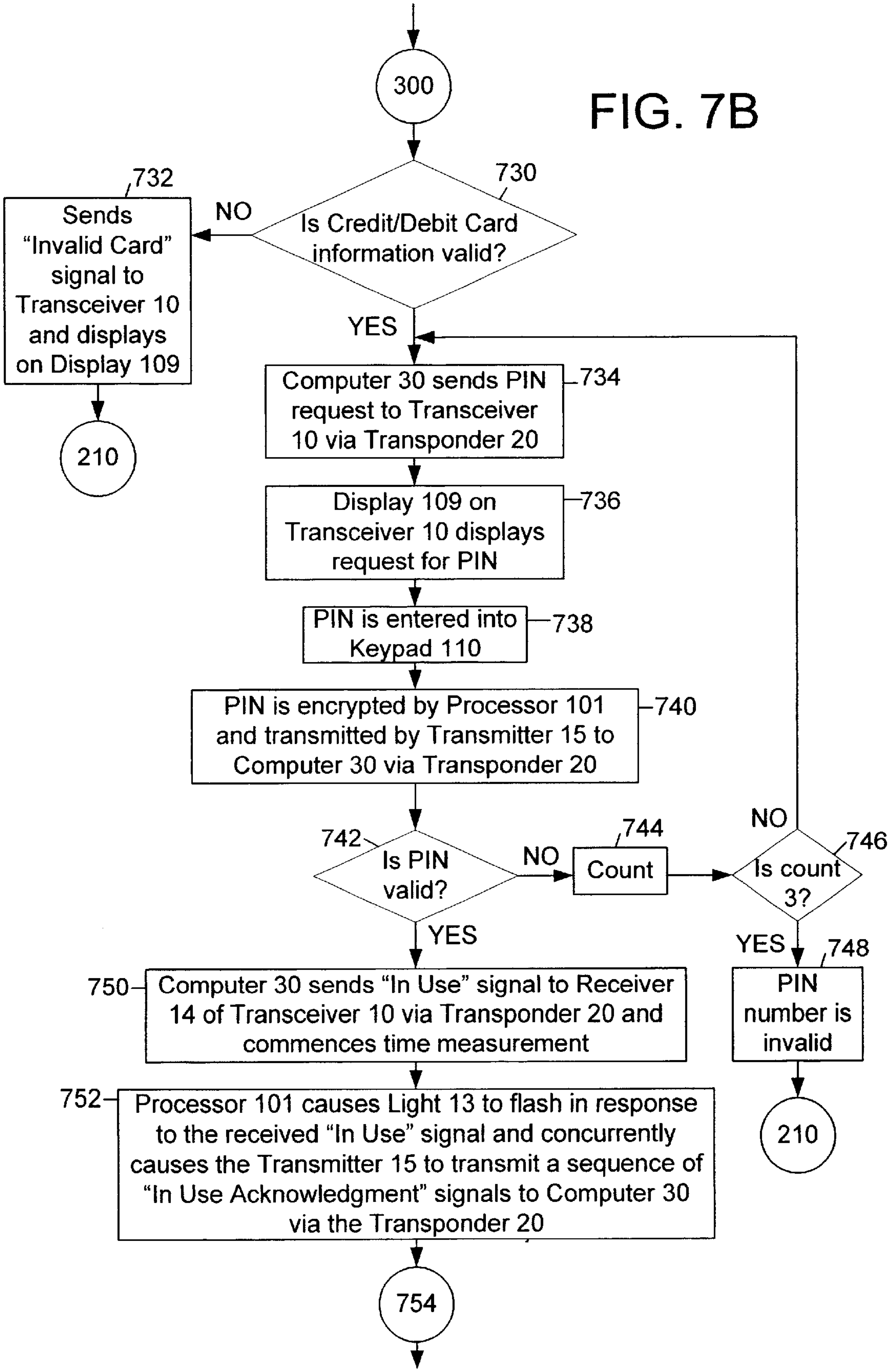
Figure 7B:
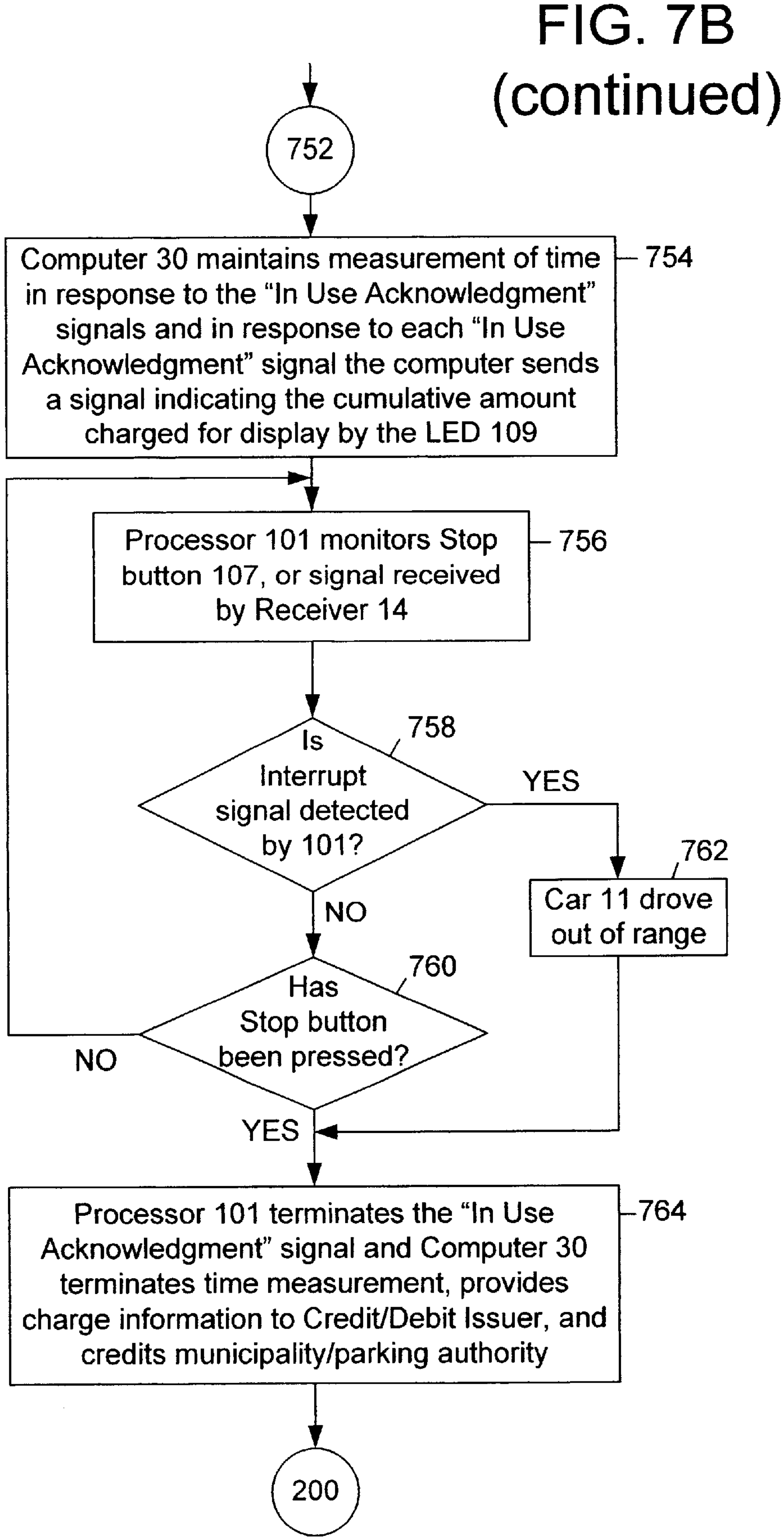

FIG. 6 shows a parking meter 65 configured with a meter transceiver 60, in accordance with the present invention. Preferably, meter transceiver 60 is configured to fit within a standard meter housing or to couple thereto. Meter transceiver 60 includes a transmitter 61, receiver 62, and microprocessor 63 that are driven, preferably, by a battery power source 64. Transmitter 61 and receiver 62 provide a communications interface with transponder 20, as previously discussed. For example, meter transceiver 60 communicates an authorization signal to central computer system 30 via transponder 20 in response to coin inputs at the meter. In various embodiments, transmitter 61 and receiver 62 may also, or alternatively, be configured to communicate with in-ground unit 50, meter monitor device 40, and/or portable transponder 10.

The invention may be embodied in other specific forms without departing from the spirit or central characteristics thereof. For example, the various components may be implemented in private parking garages to ensure proper parking and facilitate payment of associated parking, or garage entrance, fees. The present embodiments are therefore to be considered in all respects as illustrative and not restrictive, the scope of the invention being indicated by appending claims rather than by the foregoing description, and all changes that come within the meaning and range of equivalency of the claims are therefore intended to be embraced therein.

What is claimed is:

1. An automated parking space monitoring system configured to monitor a plurality of parking spaces, said monitoring system comprising:

A. a database comprising a unique space identification associated with each of said parking spaces;

B. a plurality of vehicle presence detectors, wherein each vehicle presence detector is configured to provide an indication of the presence of a vehicle in an associated one of said parking spaces;

C. one or more portable remote transceivers configured to generate an authorization signal as a function of a set of valid inputs;

D. a plurality of transponders, wherein each transponder is associated with one or more of said parking spaces and is configured to receive:

(1) vehicle presence indications from a corresponding set of vehicle presence detectors; and (2) authorization signals from said portable transceivers; and E. a controller coupled to said database and said transponders, said controller configured to selectively authorize use of an occupied space, from said plurality of parking spaces, as function of:

(1) a space identification corresponding to said occupied space;

(2) a vehicle presence indication associated with said occupied space; and (3) an authorization signal associated with said occupied space.

2. A system as in claim 1, wherein said vehicle presence detector is configured to generate a signal indicative of said parking space being vacant and to cease generation of said signal in response to said presence of said vehicle in said parking space, wherein said space occupied indication is the absence of said signal.

3. A system as in claim 1, wherein said authorization signal includes a transceiver ID.

4. A system as in claim 1, wherein said set of valid inputs includes account information used to pay parking fees.

5. A system as in claim 4, wherein said portable transceiver includes:

a) a debit/credit card reader, wherein said portable transceiver is configured to transmit corresponding credit/debit card information to said controller to facilitate payment of parking fees using said debit/credit card reader.

6. A system as in claim 1, wherein and said set of valid inputs includes a PIN, and said portable transceiver includes:

a) a user input mechanism, configured to facilitate entry of said PIN.

7. A system as in claim 1, wherein said authorization signal includes an indication that a user of said transceiver is affiliated with a group of authorized users, wherein said group of authorized users is chosen from a group comprising:

a) police, fire, or medical personnel;

b) government personnel;

c) monthly pass holders;

d) VIPs; and e) club members.

8. A system as in claim 1, further comprising:

F. a meter device, located proximate to said parking space and including a meter transceiver configured to communicate with a corresponding one or more of said transponders, wherein said meter device is configured to accept one or more of set of valid inputs.

9. A system as in claim 8, wherein said meter device is configured to accept currency and said set of valid inputs includes currency inputs.

10. An automated parking space monitoring system configured to monitor a plurality of parking spaces, said monitoring system comprising:

A. a database comprising a unique space identification associated with each of said parking spaces;

B. a plurality of vehicle presence detectors, wherein each vehicle presence detector is configured to provide an indication of the presence of a vehicle in an associated one of said parking spaces, wherein said vehicle presence detector is an in-ground detector, located proximate to or within said parking space;

C. one or more portable transceivers configured to generate an authorization signal as a function of a set of valid inputs;

D. a plurality of transponders, wherein each transponder is associated with one or more of said parking spaces and is configured to receive:

(1) vehicle presence indications from a corresponding set of vehicle presence detectors; and (2) authorization signals from said portable transceivers; and E. a controller coupled to said database and said transponders, said controller configured to selectively authorize use of an occupied space, from said plurality of parking spaces, as function of:

(1) a space identification corresponding to said occupied space;

(2) a vehicle presence indication associated with said occupied space; and (3) an authorization signal associated with said occupied space.

11. A system as in claim 10, wherein said vehicle presence detector senses the presence of a vehicle in said parking space using a sensing technique from a group of techniques comprising:

a) magnetic sensing;

b) infrared sensing;

c) motion detection sensing;

d) pressure sensing;

e) audio sensing; and f) video sensing.

12. A system as in claim 1, wherein said controller is further configured to generate a violation signal as a function of said vehicle presence indication and the absence of said authorization signal.

13. An automated parking space monitoring system configured to monitor a plurality of parking spaces, said monitoring system comprising:

A. a database comprising a unique space identification associated with each of said parking spaces;

B. a plurality of vehicle presence detectors, wherein each vehicle presence detector is configured to provide an indication of the presence of a vehicle in an associated one of said parking spaces;

C. one or more portable transceivers configured to generate an authorization signal as a function of a set of valid inputs;

D. a plurality of transponders, wherein each transponder is associated with one or more of said parking spaces and is configured to receive:

(1) vehicle presence indications from a corresponding set of vehicle presence detectors; and (2) authorization signals from said portable transceivers; and E. a controller coupled to said database and said transponders, said controller configured to selectively authorize use of an occupied space, from said plurality of parking spaces, as function of:

(1) a space identification corresponding to said occupied space;

(2) a vehicle presence indication associated with said occupied space;

(3) an authorization signal associated with said occupied space, wherein said controller is further configured to generate a violation signal as a function of said vehicle presence indication and the absence of said authorization signal; and F. a monitor device having an output means and configured to receive said violation signal and to present an indicia of a violation status and an identification of said parking space via said output means.

14. A system as in claim 13, wherein said monitor device is further configured to probe a vehicle presence detector, from said plurality of vehicle presence detectors, and determine if said probed vehicle presence detector is operating properly.

15. A system as in claim 1, wherein said portable transceiver is configured to store parking credits, wherein said authorization signal includes indicia of parking credits and said controller is configured to apply said parking credits to pay fees associated with said occupied parking space.

16. A system as in claim 1, wherein said controller is further configured to cease authorization to use said occupied space in response to absence of said vehicle presence indication.

17. A system as in claim 1, wherein said parking space is a space chosen from a group comprising:

a) publicly metered spaces;

b) assigned parking garage spaces; and c) unassigned parking garage spaces.

18. A method of monitoring a plurality of parking spaces, said method comprising:

A. detecting with a vehicle presence detector a vehicle in an occupied space, from said plurality of parking spaces, and providing a vehicle presence indication corresponding to said occupied space to a transponder;

B. generating with a portable transceiver an authorization signal as a function of a set of valid inputs and providing said authorization signal to said transponder; and C. communicating said vehicle presence indication and said authorization signal from said transponder to a controller that is coupled to a database comprising a unique space identification associated with each of said parking spaces; and D. authorizing, by said controller, use of said occupied parking space as a function of a space identification corresponding to said occupied space, said vehicle presence indication and said authorization signal.

19. A method as in claim 18, wherein said vehicle presence detector is configured to generate a signal indicative of said parking space being vacant and wherein providing said vehicle presence indication includes ceasing generation of said signal.

20. A method as in claim 18, wherein part B includes providing a transceiver ID and a PIN as valid inputs.

21. A method as in claim 18, wherein said portable transceiver includes a debit/credit card reader and part B includes entering credit or debit card information via said portable transceiver.

22. A method as in claim 18, wherein part B includes identifying a user of said portable transceiver as a member of a group of authorized users, chosen from a group comprising:

a) police, fire, or medical personnel;

b) government personnel;

c) monthly pass holders;

d) VIPs; and e) club members.

23. A method as in claim 18, further comprising:

E. in lieu of part B, generating, with a meter device located proximate to said parking space, an authorization signal as a function of a set of valid inputs and providing said authorization signal to said transponder.

24. A method as in claim 23, wherein said valid inputs include at least one of parking credit inputs, currency inputs, credit card inputs, or debit card inputs.

25. A method as in claim 18 wherein part A includes detecting the presence of said vehicle with an in-ground detector located proximate to or within said parking space.

26. A method as in claim 18 wherein part A includes detecting the presence of said vehicle using a sensing technique chosen from a group of techniques comprising:

a) magnetic sensing;

b) infrared sensing;

c) motion detection sensing;

d) pressure sensing;

e) audio sensing; and f) video sensing.

27. A method as in claim 18, further comprising:

E. generating by said controller a violation signal as a function of the presence of said vehicle presence indication and the absence of said authorization signal.

28. A method as in claim 18, further comprising:

E. probing, with a monitoring device, said vehicle presence detector to determine if said vehicle presence detector is operating properly.

29. A method as in claim 18, wherein said authorization signal includes indicia of parking credits and said controller applies said parking credit to pay parking fees associated with said parking space.

30. A method as in claim 18, wherein said parking space is a space chosen from a group comprising:

a) publicly metered spaces;

b) assigned parking garage spaces; and c) unassigned parking garage spaces.

31. A portable transceiver for use with a parking space monitoring system configured to selectively authorize use of a parking space, from a database of uniquely identified parking spaces, said portable transceiver comprising:

A. a processor coupled to a storage device and a power source;

B. a credit/debit card reader configured to facilitate payment of parking fees or a purchase of parking credits using a credit or debit card;

C. a user input device, configured to facilitate entry of a set of valid inputs, said valid inputs including at least one of an identification of a user, an identification of said transceiver, or parking credit, credit, or debit account information;

D. a signal generator configured to generate an authorization signal as a function of said set of valid inputs, wherein said authorization signal and a vehicle presence indication from a space oriented vehicle detector are required by said parking space monitoring system to authorize use of said parking space.

E. a user manipulatable activation mechanism, configured to commence transmission of said authorization signal; and F. a transmitter configured to transmit said authorization signal in response to manipulation of said activation mechanism.

* * * * *